(12) United States Patent
Matsumura et al.

(10) Patent No.: US 7,165,106 B2
(45) Date of Patent: Jan. 16, 2007

(54) METHOD OF MANAGING OPERATION OF COMPUTER SYSTEM

(75) Inventors: Eiji Matsumura, Yokohama (JP); Toshiaki Hirata, Kashiwa (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 10/417,267

(22) Filed: Apr. 17, 2003

(65) Prior Publication Data

US 2003/0200310 A1    Oct. 23, 2003

Related U.S. Application Data

(63) Continuation of application No. 09/188,245, filed on Nov. 9, 1998, now abandoned.

(30) Foreign Application Priority Data

Nov. 7, 1997   (JP)   ................................. 9-306066

(51) Int. Cl.
*G06F 15/16* (2006.01)
*G06F 9/00* (2006.01)
(52) U.S. Cl. ...................... 709/224; 709/202; 709/228; 370/331; 379/63
(58) Field of Classification Search ................ 709/206, 709/217, 218, 220, 222, 225, 226, 228, 310, 709/202, 224, 227; 364/271, 281.4, 133; 370/331; 379/63
See application file for complete search history.

(56) References Cited

U.S. PATENT DOCUMENTS

| | | | | |
|---|---|---|---|---|
| 5,193,172 A | * | 3/1993 | Arai et al. .................. | 718/104 |
| 5,293,620 A | | 3/1994 | Barabash et al. ........... | 709/201 |
| 5,313,632 A | | 5/1994 | Sekizawa et al. ........... | 709/203 |
| 5,361,369 A | | 11/1994 | Kametami .................. | 709/201 |
| 5,377,352 A | * | 12/1994 | Tanaka et al. .............. | 718/103 |
| 5,655,081 A | | 8/1997 | Bonnell et al. ............. | 709/202 |
| 5,793,365 A | | 8/1998 | Tang et al. ................. | 345/329 |
| 6,067,634 A | * | 5/2000 | Nelson ........................ | 714/4 |
| 6,098,091 A | * | 8/2000 | Kisor ......................... | 709/202 |

(Continued)

FOREIGN PATENT DOCUMENTS

JP      6358568      3/1988

(Continued)

OTHER PUBLICATIONS

R. Snodgrass, "A Relational Approach to Monitoring Complex Systems", ACM Transactions on Computer Systems, vol. 6, No. 2, May 1988, pp. 157-196.

(Continued)

*Primary Examiner*—Khanh Quang Dinh
(74) *Attorney, Agent, or Firm*—Mattingly, Stanger, Malur & Burndidge, P.C.

(57) ABSTRACT

Object matters handled by each program constituting a work are assorted and classified into a system, and an ID information for discriminating the work is added to a definition information relating to the execution of the work and to an information representing the events which occur with the execution of the work, in order to achieve a unitary management. A priority is assigned to each event occurring with the execution of the work, and whether the information representing the event is to be transferred or stored is decided so as to accomplish the objectives described above.

4 Claims, 8 Drawing Sheets

U.S. PATENT DOCUMENTS

| | | | | |
|---|---|---|---|---|
| 6,148,322 A | * | 11/2000 | Sand et al. | 718/103 |
| 6,289,382 B1 | * | 9/2001 | Bowman-Amuah | 709/226 |
| 6,425,017 B1 | * | 7/2002 | Dievendorff et al. | 709/315 |
| 6,445,968 B1 | * | 9/2002 | Jalla | 700/101 |
| 6,597,688 B1 | * | 7/2003 | Narasimhan et al. | 370/353 |

FOREIGN PATENT DOCUMENTS

| | | |
|---|---|---|
| JP | 63300328 | 12/1988 |
| JP | 04172045 | 6/1992 |
| JP | 5204783 | 8/1993 |
| JP | 8314763 | 11/1996 |
| JP | 09006697 | 10/1997 |

OTHER PUBLICATIONS

D. Ogle et al, "Application-Dependent Dynamic Monitoring of Distributed and Parallel Systems", 8354 IEEE Transactions on Parallel and Distributed Systems IEEE Transact, Jul. 4, 1993, No. 7, pp. 762-778.

M. Bauer, "MANDAS: Management of Distributed Applications and Systems" Proceedings of the 5$^{th}$ IEEE Computer Society Workshop on Future Trends of Distributed Computing System, South Korea, pp. 200-206, 1995.

* cited by examiner

METHOD OF MANAGING OPERATION OF COMPUTER SYSTEM

The present application is a continuation of application Ser. No. 09/188,245, filed Nov. 9, 1998, now abandoned the contents of which are incorporated herein by reference.

BACKGROUND OF THE INVENTION

The present invention relates to a method of managing a work operation of a network computer system comprising a plurality of computers.

As a system has become greater in size and global, works executed daily have been decentrailized and globalized, too. For instance, there may be the case where one work is dividedly allocated to, and executed by, a plurality of computers because throughput of one computer is not sufficient. There is the case where large quantities of data dispersedly stored in a plurality of computers are processed by each computer to obtain an intermediate result and these results are gathered together at one position to obtain a final result. In such a case, because management has been made in the past only as to which computer executes which work, a manager cannot easily grasp the relationship of divided works if one work is divided and allocated to a plurality of computers. It is therefore desired to provide a service which can supervise the execution of works and which is directed to a manager for supervising the execution of the works by managing divided works as one work even when a certain work is divided and allocated to a plurality of computers such a server would eliminate the need for examining in advance the computer or computers that execute the work or the divided works.

It has been customary to immediately transfer an information representing various events (e.g. start, termination, abnormal termination, etc.) that occur with the execution of the work to a computer for supervising the work. Therefore, a problem remains unsolved that those events which are rarely looked up usually (start, termination, etc.) are transferred in vain though they are necessary for the supervision purpose. Thus, the service should have as its aim reducing the transfer quantity of information by transferring only the reformation having high urgency such as the occurrence of abnormality when the events occur.

It has also been customary in the past to altogether store various definition informations relating to the execution of the work (e.g. execution schedules, execution parameters, etc.) in one place. This renders the problem that a long time is necessary for looking up the definition information for executing the work, though management is easy.

SUMMARY OF THE INVENTION

The purpose of the present invention is to reduce the time required for looking up the definition information by duplicately storing the definition information in a plurality of computers.

To accomplish the purpose described above, the present invention assorts and classifies the objects handled by each program that constitutes a work and puts common terms together into one system, and generates ID information that discriminates works. The present invention adds this ID information to various definition informations (execution schedules, execution parameters, etc.) relating to the execution of the work and to an information representing all the events that occur with the execution of the work (start, termination, abnormal termination, etc.). The present invention further unitarily manages these informations so that supervision of the execution of work and its control (change of the schedules, change and addition of executing computers, etc.) can be done by using the ID information as a key.

The present invention assigns a priority to all the events (start, termination, abnormal termination, etc.) occurring with the execution of the work in accordance with their urgency. Whether or not the information representing the event is to be immediately transferred to a computer supervising the work or whether or not the information is to be stored in the computers in which the respective events occur or in a computer or computers near the computers inviting such events, are decided in the order of this priority. The supervisor need not know the events in the normal operation (start and termination of the work, etc.) so long as the work is executed normally and smoothly (particularly when a computer system includes the huge number of computers), and they are not transferred to the computer supervising the execution of the work. In consequence, the transfer quantity of information can be reduced. The ID information for discriminating the work is added to the information that is dispersedly stored. Therefore, whenever necessary (such as when the status of a specific work is desired to be known), the information can be retrieved upon request from the computer supervising the work and only necessary information can be taken out. The information that is dispersedly stored can be retrieved simultaneously by a plurality of computers having the stored information, and the time for retrieving is short.

Further, the present invention stores duplicately various definition informations (execution schedules, execution parameters, etc.) relating to the execution of the work in a plurality of computers. Generally, updating frequency of such definition informations is low. Therefore, the present invention can reduce the time necessary for looking up the definition informations at the time of the execution of the work. When the definition information is to be updated, only the changed portion must be transferred. Therefore, the time for transfer can be reduced, too.

DESCRIPTION OF THE PREFERRED ENBODIMENTS

An embodiment of the present invention will be explained hereinafter with reference to FIGS. 1 and 2.

Figure 1:
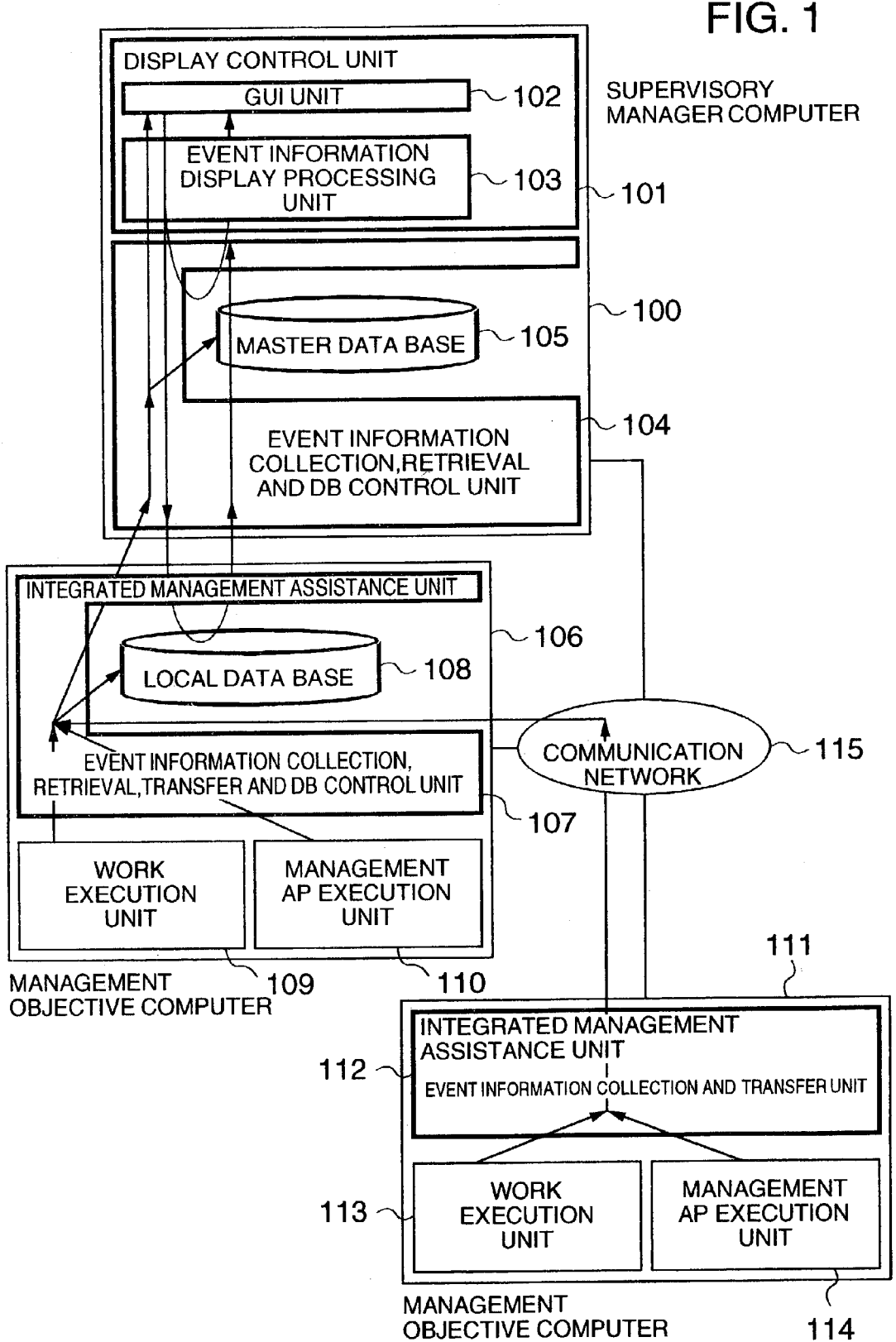
FIG. 1 is a block diagram showing a system construction and an execution procedure for enabling a supervisory manager computer to supervise the work carried out dividedly by a plurality of computers.

FIG. 1 shows a system construction and an execution procedure for enabling a supervisory manager computer to supervise the work carried out dividedly by a plurality of computers without determining in advance which work is to be executed by which computer. A supervisory manager computer 100 comprises a display control unit which in turn comprises an event information display processing unit 103 for looking up various events that occur with the execution of the works in management objective computers 106 and 111, such as the start of the work, the normal termination, abnormal termination, etc. and a GUI unit 102 for displaying and operating the various events; a unit 104 for collecting event informations which must be dealt with urgently or quickly among the events occurring with the execution of the work in the management objective computers 106 and 111, such as abnormal termination of the work, shortage of a disk capacity, and so forth, displaying such informations in the GUI unit 102 and storing them in a master data base 105, retrieving the event informations so stored, instructing retrieval to the management objective computer 106 having a local data base 108 if necessary event information is not found out, and controlling collection of the retrieving result and its display in the GUI unit 102; and the master data base 105.

Each of the management objective computers 106, 111 comprises a work execution unit 106, 113 for handling the actual work itself or a management application (hereinafter called "AP") execution unit 110, 114 for managing the work execution such as a job scheduler, an integrated management assistance unit 107, 112 for accomplishing the integrated management, and a local data base 108. When the management objective computer has the local data base, the integrated management assistance unit transfers to the supervisory manager computer 100 those event informations which must be dealt with urgently or quickly, such as abnormal termination of the work, shortage of the disk capacity, etc. among the events occurring with the execution of the work by the integrated management assistance unit itself or by the management objective computer not having such a local data base, stores other event informations in the local data base 108, executes retrieval upon instruction from the supervisory manager computer 100 and transfers the retrieving result to the integrated manager computer. When the management objective computer does not have the local data base, the integrated management assistance unit transfers all those events which occur with the execution of the work by itself to the management objective computers having the local data base. Incidentally, the supervisory manager computer 100 and the management objective computers 106 and 111 are connected with one another through a communication network 115.

Figure 2:
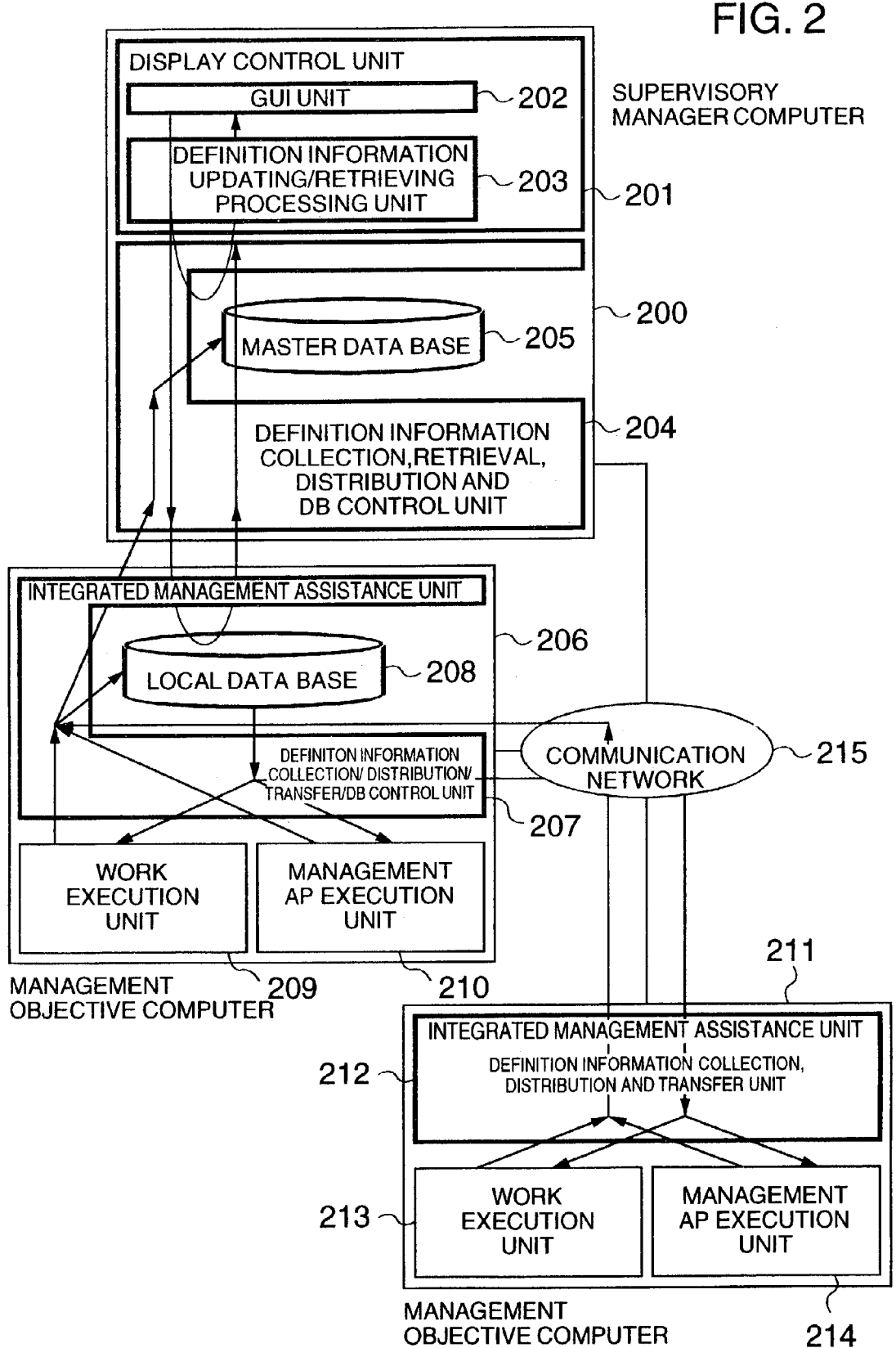
FIG. 2 is a block diagram showing a system construction and an execution procedure for enabling a supervisory manager computer to control the execution of the work carried out dividedly by a plurality of computers.

FIG. 2 shows a system construction and an execution procedure for enabling the supervisory manager computer to control the execution of the work executed dividedly by a plurality of computers without determining in advance in which computer the definition information of the work is stored. The supervisory manager computer 200 comprises a display control unit which in turn comprises a definition information updating/displaying processing unit 203 for looking up and updating various definition informations about the execution of the work such as the execution schedule and the execution parameters of the work executed by the management objective computers 206 and 211, and a GUI unit 202 for displaying and operating these informations; a unit 204 for collecting various definition informations relating to the execution of the work such as the execution schedule and the execution parameters of the work executed by the management objective computers 206 and 211, storing the definition informations in a master data base 205, retrieving the definition informations so stored and distributing the updated definition informations to the management object computer 206 having the local data base 208; and the master data base 205.

Each of the management objective computers 206 and 211 comprises a work execution unit 209, 213 for executing the practical work itself or a management AP execution unit 210, 214 for managing the execution of the work such as a job scheduler, an integrated management assistance unit 207, 212 for achieving the integrated management and the local data base 208. When the management objective computer has the local data base, the integrated management assistance unit transfers various definition informations about the executions of the work such as the execution schedules and the execution parameters of its own and those of the management objective computers not having the local data base, stores such definition informations in the local data base 208, updates the information upon instruction from the integrated manager computer 200 and transfers the updating result to the integrated management assistance unit itself and to the work executed by the management objective computers not having the local data base. When the management objective computers do not have the local data base, the integrated management assistance unit transfers all of various definition informations about the execution of the work such as the execution schedule and the execution parameters executed by itself to the management objective computers having such a local data base, and transfers the retrieving result transferred thereto from the management objective computers having the local data base to the work executed by the management objective computers. Incidentally, the supervisory manager computer 200 and the management objective computers 206 and 211 are connected with one another through the communication between 215.

Figure 3:
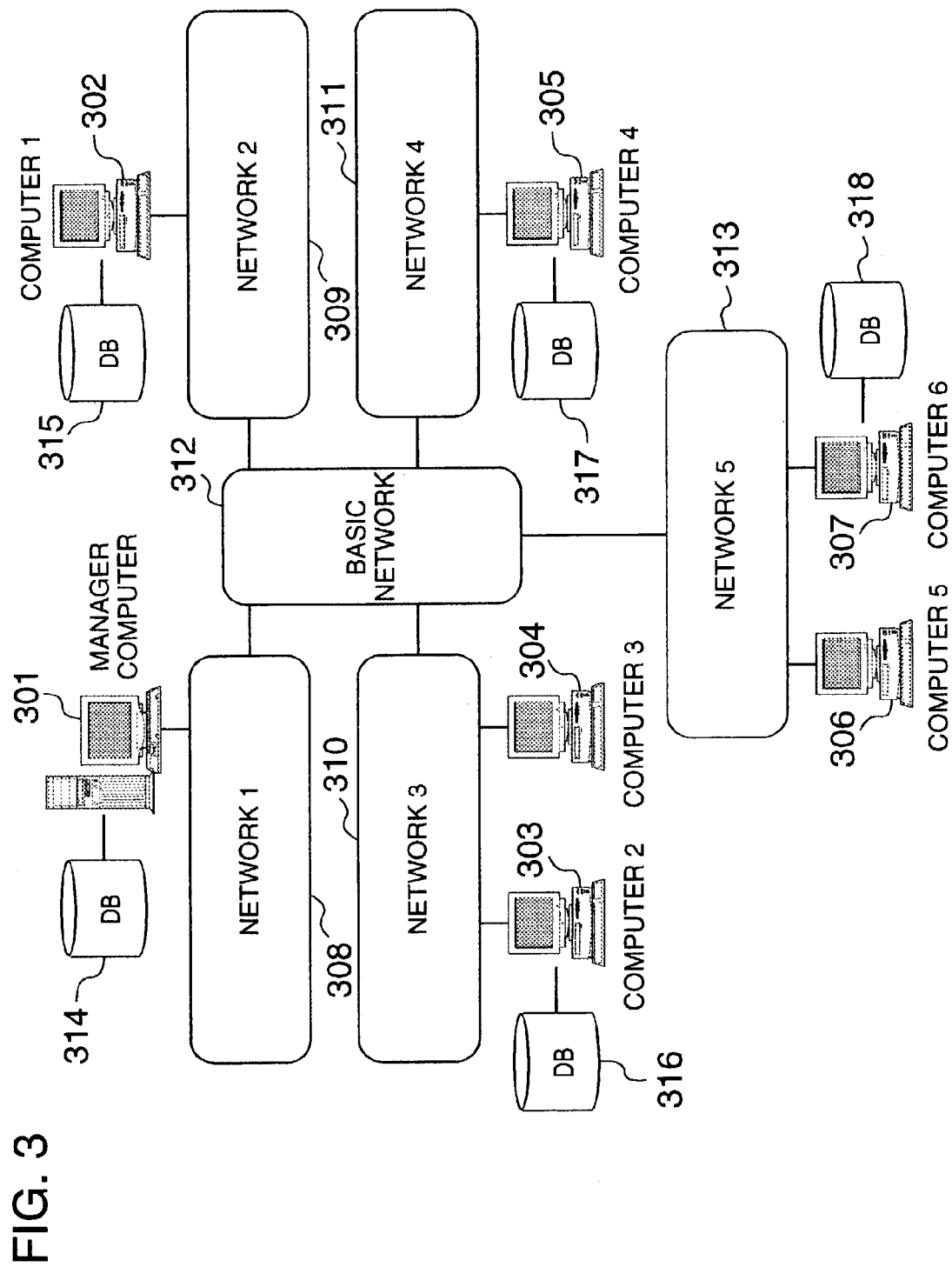
FIG. 3 is a schematic view showing a network construction in an embodiment of the present invention.

FIG. 3 shows an example of the network construction in the embodiment of the present invention. The supervisory manager computer 301 can supervise the execution state of the work executed by each computer 302 to 307, and can change the definition relating to the work execution. The supervisory manager computer 301 has the master data base 314 (abbreviated as "DB" in the drawing) and each network 308 to 313 has at least one computer having the local data base.

Though this condition is not essential, such a network construction can reduce the quantity of data flowing through the network and can also reduce the time necessary for looking up the information stored in the data base from each computer.

Figure 4:
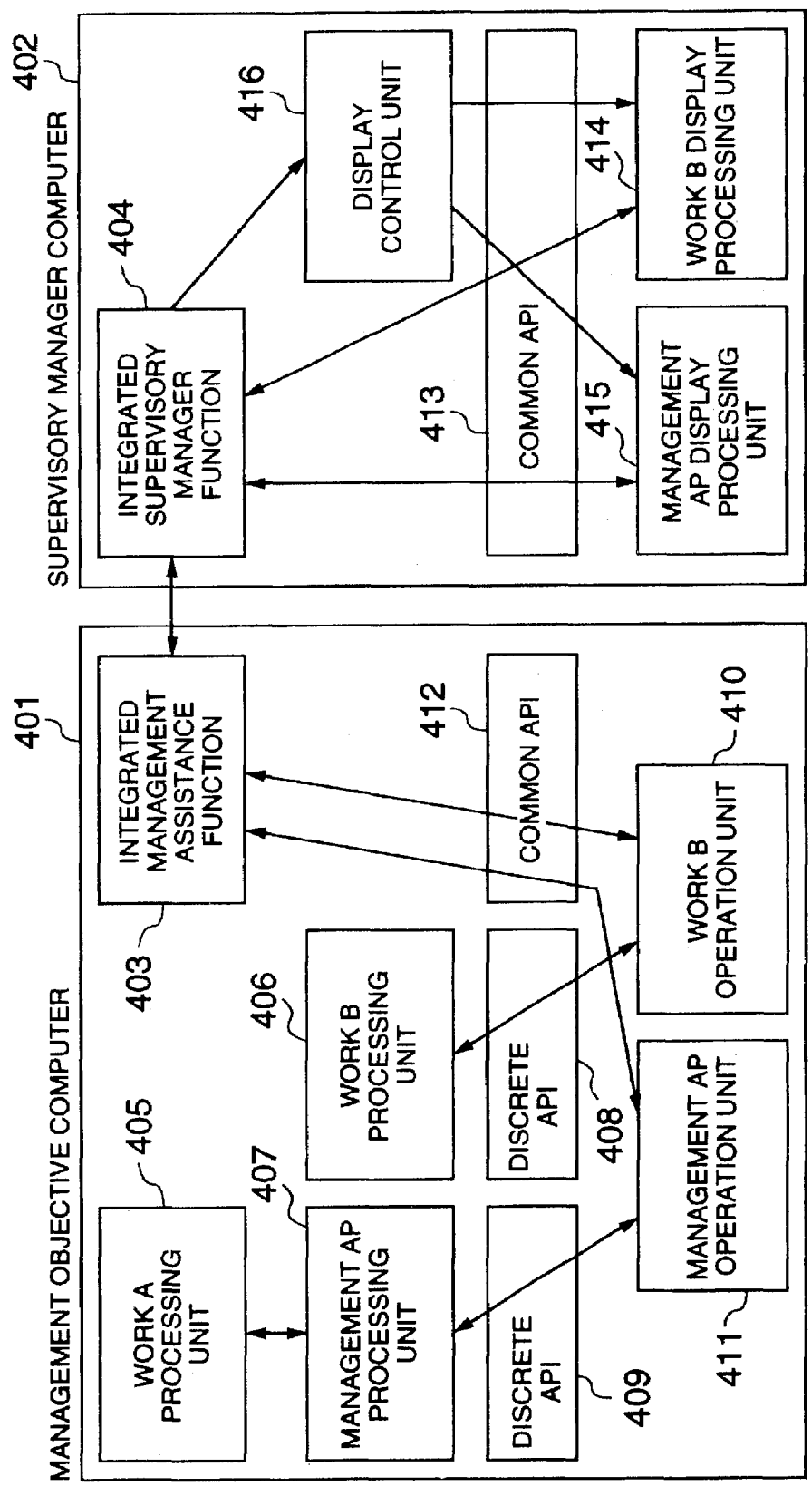
FIG. 4 is a block diagram showing an example of the software construction of a computer system in an embodiment of the present invention.

FIG. 4 shows an example of the software construction of the management objective computer 401 and the supervisory manager computer 402 in the embodiment of the present invention. The management objective computer 401 includes the integrated management assistance unit 403 and manages this computer on the basis of the instruction from the supervisory manager computer. However, a concrete management processing varies with the managed objects. Broadly, this management processing can be divided into an indirect management using the management AP for managing the work and a direct management for directly managing the work. The management processing is executed from the integrated management assistance unit 403 through the management AP operation unit 411 in the case of the former and through the work B operation unit 410 in the latter. In this case, the interface (409) between the management AP processing unit 407 and the management AP operation unit 411 and the interface (408) between the work B processing unit 406 and the work 8 operating unit 410 become discrete, but the interface (412) with the respective operation units as viewed from the integrated management assistance unit becomes common. Therefore, even when another managed object is added, the range of influence of this addition is limited, and the addition of functions becomes easy.

The supervisory manager computer 402 includes an integrated supervisory manager 404 and has a user interface for managing the entire system but processing for concrete display for the manager and for the operation of the manager varies with each management function. This processing is broadly divided into an indirect display/operation by using the management AP for managing the work and a direct display/operation of the work. Because the interface with each operation unit as viewed from the integrated management assistance unit is common, the interfaces between the management AP display processing unit 415 and the management AP operation unit 411 and between the work B display processing unit 414 and the work B operation unit 410 and the interface (413) of the display control unit 416 having the direct interface with the management AP display unit 415, the work B display processing unit 414 and the manager can be made common.

Figure 5:
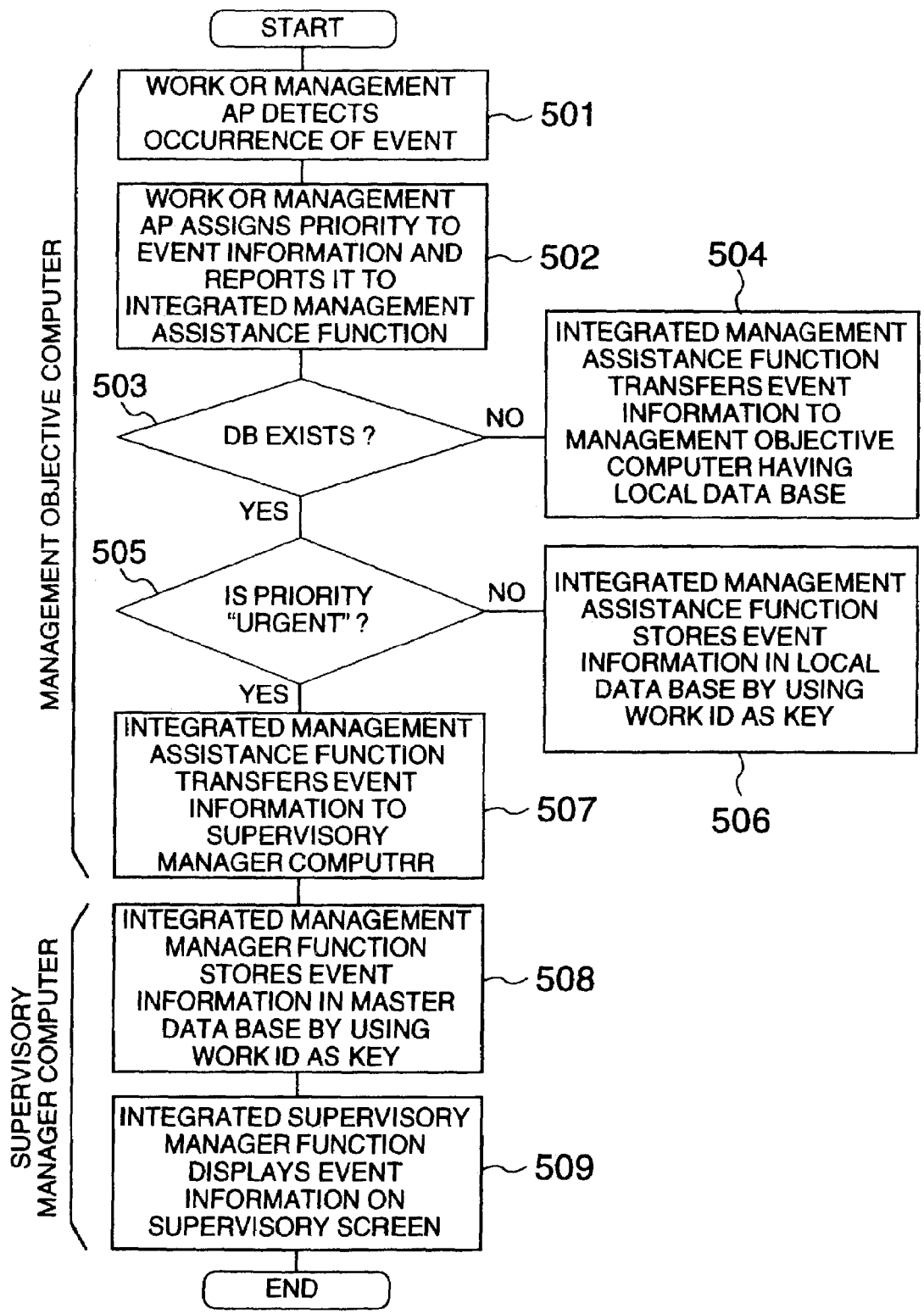
FIG. 5 is a flowchart useful for explaining a procedure for collecting various event informations.
Figure 6:
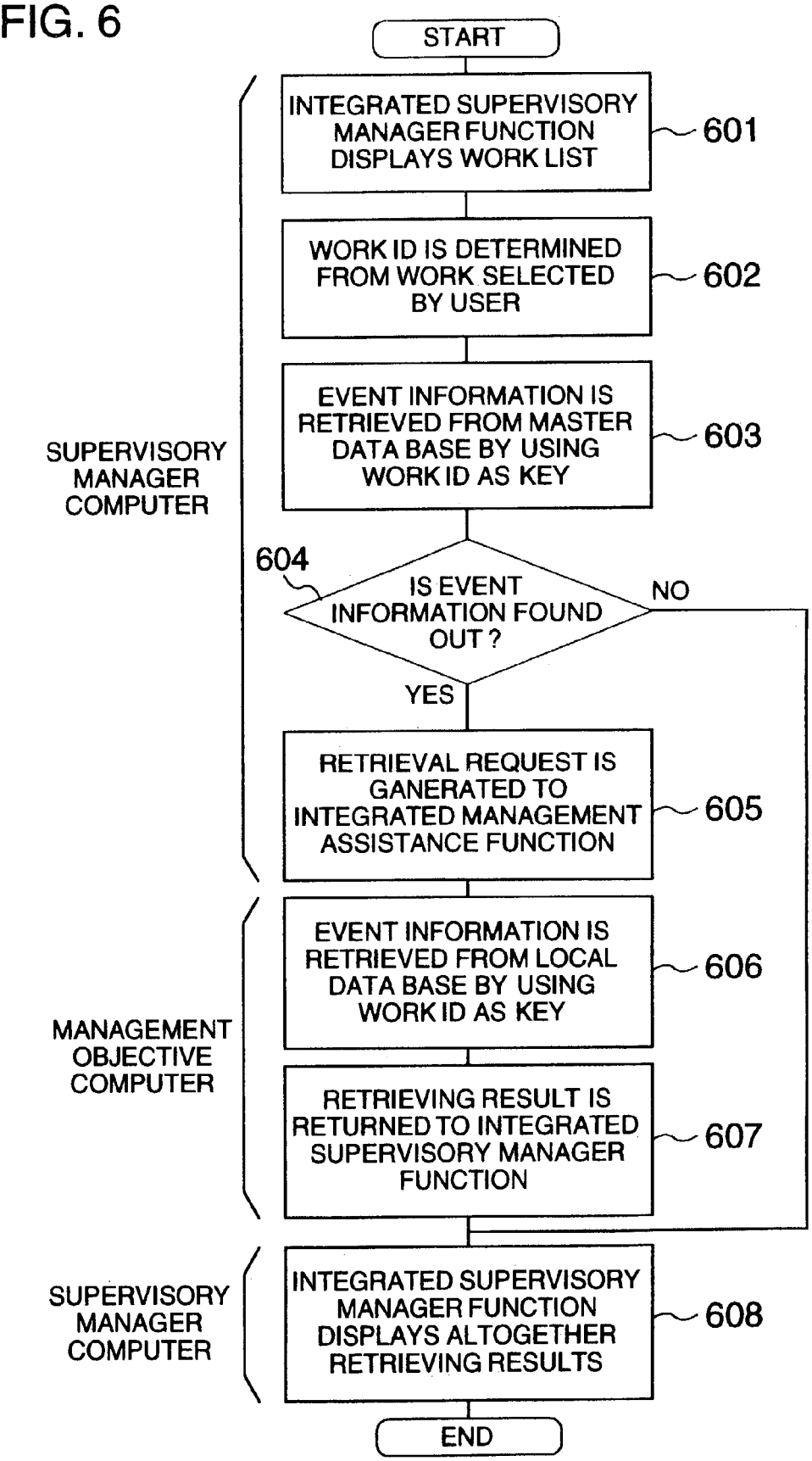
FIG. 6 is a flowchart useful for explaining a procedure for looking up various event informations.

The procedures for collecting and looking up various event informations that occur with the execution of the work in the construction shown in FIG. 1 will be explained with reference to FIGS. 5 and 6. In the management objective computer, the work or management AP detects the occurrence of an event with the execution of the work (501). The work or management AP assigns a predetermined priority to each event information and sends it to the integrated management assistance unit inside the same computer (502). If the computer does not have the local data base, the integrated management assistance unit transfers the event information to the management object computer having the local data base (504). If the computer has the local data base (503), the integrated management assistance unit stores the event information in the local data base by using the work ID as a key (506) if the priority of the event information is not urgent (505). If the priority of the event information is urgent (505), the integrated management assistance unit transfers the event information to the supervisory manager computer (507). Receiving the event information, the supervisory manager computer stores it in the master data base (508). The supervisory manager computer also displays the event information it receives on the supervisory screen (509) Next, the manager existing in front of the supervisory manager computer represents the procedure for knowing the status of a specific work. First, the supervisory manager displays a work list (601). The work ID corresponding to the work selected by the manager is then determined from the work list. The supervisory manager retrieves the master data base by using the work ID so determined as the key (603). When the event information is found out in the master data base (604), its content is displayed on the supervisory screen. If the event information is not found out in the master data base (604), a retrieval request is generated for the integrated management assistance units of all the management objective computers having the local data base (605). The integrated management assistance unit of each management objective computer having the local data base retrieves the local data base by using the designated work ID as the key (606). The integrated management assistance unit then returns the retrieving result to the integrated management manager (607). The integrated management manager displays altogether all the retrieving results on the supervisory screen (608)

In this way, supervision of the work executed dividedly by a plurality of computers can be made without determining in advance by which computer the work is to be done.

Figure 7:
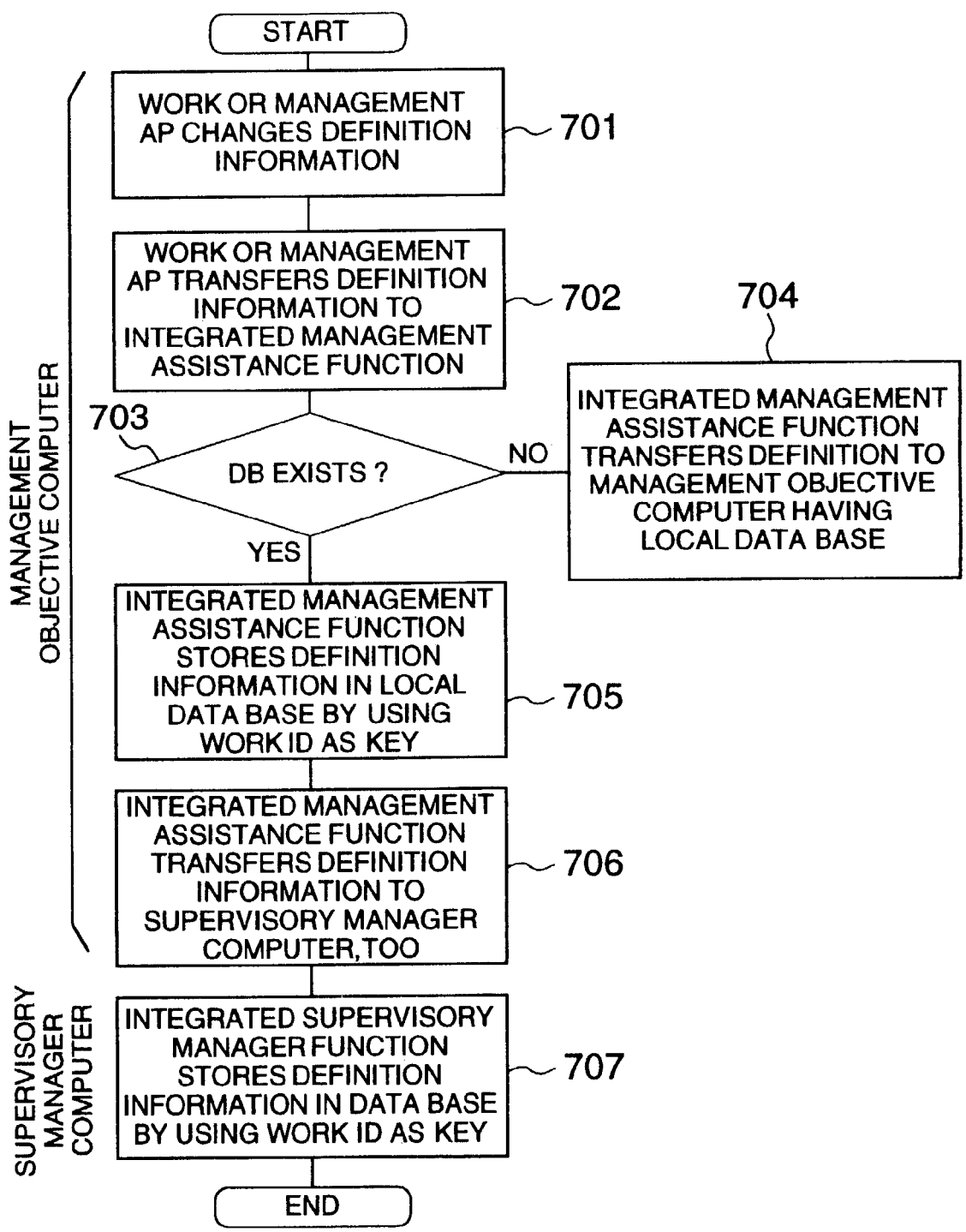
FIG. 7 is a flowchart useful for explaining a procedure for collecting various definition informations.
Figure 8:
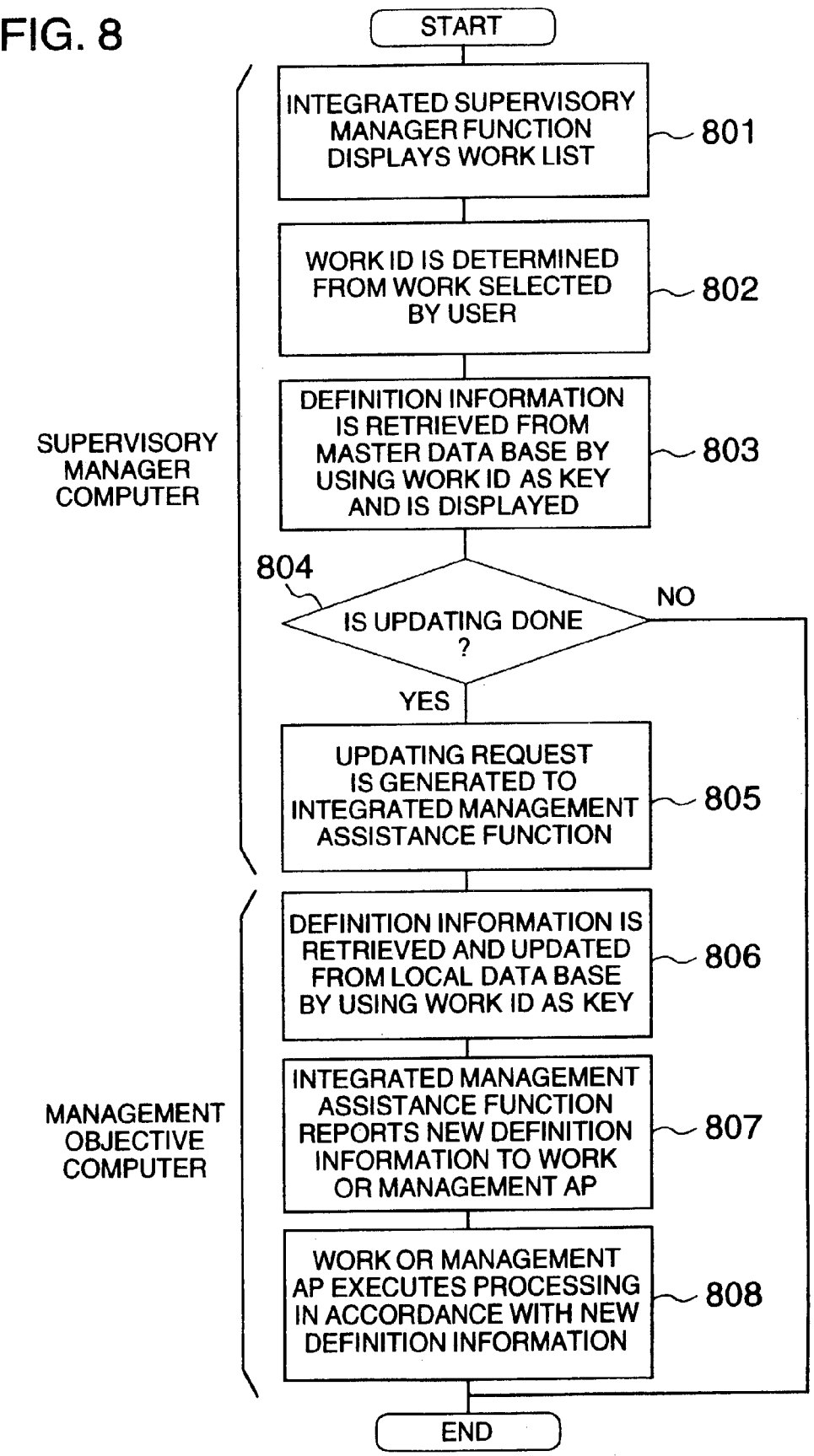
FIG. 8 is a flowchart useful for explaining a procedure for updating/distributing various definition informations.

The procedures for collecting, updating and distributing various definition informations relating to the execution of the work in the construction shown in FIG. 2 will be explained with reference to FIGS. 7 and 8. The work or management AP in the management objective computer changes its own definition information with the execution of the work (710). The work or management AP sends the changed definition information to the integrated management assistance unit inside the same computer (702). If the computer does not have the local data base (703), the integrated management assistance unit sends the changed definition information to the management objective computer having the local data base (704). If the computer has the local data base (703), the integrated management assistance unit stores the changed definition information into the local data base by using the work ID as the key (705). The integrated management assistance unit also transfers the changed definition information to the supervisory manager computer (706). The supervisory manager computer stores the definition information it receives in the master data base (707). Next, the manager in front of the supervisory manager computer represents the procedure for looking up and changing the definition information of a specific work.

First, the supervisory manager displays the work list (801) and the work ID corresponding to the work selected by the manager is determined (802). The supervisory manager retrieves the master data base by using the work ID so determined as the key and displays it on the supervisory screen (803). When the manager updates the definition information (804), an updating request is generated for the integrated management assistance unit of all the management objective computers having the local data base (805). The integrated management assistance unit of each management objective computer having the local data base retrieves and updates the local data base by using the designated work ID as the key (806). The integrated management assistance unit reports the changed definition information to the work or management AP (807). The work or management AP executes the processing in accordance with the new definition (808). In this way, control of the execution of the work carried out dividedly by a plurality of computers can be made without examining in advance the computer which stores the definition of the work.

In a network computer system comprising a plurality of computers, the present invention can execute various processings relating to the operations of the work such as confirmation of the work executed dividedly by a plurality of computers, supervision of the occurrence of any abnormality, change of the work definition, etc., without examining in advance in which computer or computers the work is being executed or in which computer or computers the definition of the work is stored. Therefore, the present invention provides the effect that the execution of the work can be managed unitarily from one supervisory manager computer. Since the transfer of the information which is hardly looked up during steady supervision can be reduced in this instance, the present invention provides another effect that any excessive burden for the communication network is not applied to the operation management. Further, because the definition information which is frequently looked up during the execution of the work can be posted in the proximity of the computer that looks up the definition information, the present invention provides still another effect that the time necessary for looking up the information from each computer can be reduced.

What is claimed is:

1. A method of managing the operation of a computer system in a network which includes a manager computer and a plurality of management object computers each of which executes divided work divided from a single work, said method executed in said management object computer comprising the steps of:
    adding an indication of priority corresponding to urgency to event information generated upon occurrence of an event during execution of a divided work on said management object computer,
    wherein event information corresponding to events which occur during execution of said divided work are prioritized based on predetermined information and said indication of priority represents said prioritization;
    transferring immediately, by said management object computer, event information having high priority to a master database in said management computer,
    wherein event information having a high priority that are transferred immediately, by said management object computer, represents abnormal operation requiring immediate attention by said management computer,
    adding ID information that discriminates said work to other event information and storing said other event information to a local database in said management object computer,
    wherein said ID information uniquely identifies said single work, relative to other single works, from which said divided work is obtained and uniquely identifies said divided work, relative to other divided works, forming a part of said single work; retrieving event information corresponding to ID information included in a request received from said manager computer from said local database; and
    transferring said retrieved event information to said manager computer.

2. A computer system in a network system which includes a manager computer and a plurality of management object computers each of which executes divided work divided from a single work, said management object computer comprising:
    means for adding an indication of priority corresponding to urgency to event information generated upon occurrence of an event during execution of a work on said management object computer,
    wherein event information corresponding to events which occur during execution of said divided work are prioritized based on predetermined information and said indication of priority represents said prioritization;
    means for transferring immediately, by said management object computer, event information having high priority to a master database in said manager computer,
    wherein event information having high priority that are transferred immediately, by said management object computer, represents abnormal operation requiring immediate attention by said management computer;
    means for adding ID information that discriminates said divided work to other event information and storing said other event information to a local database in said management object computers,
    wherein said ID information uniquely identifies said single work, relative to other single works, from which said divided work is obtained and uniquely identifies said divided works, relative to other divided work, forming a part of said single work;
    means for retrieving event information corresponding to ID information included in a request received form said manager computer from said local database; and
    means for transferring said retrieved event information to said manager computer.

3. A method of managing the operation of a computer system in a network which includes a manager computer and a plurality of management object computers each of which executes divided work divided from a single work, said method executed in said management object computer comprising the steps of:
    detecting an event generated by execution of each divided work divided from said work in said management object computers to produce event information including priority corresponding to urgency of said event detected,
    wherein event information corresponding to events which occur during execution of said divided work are prioritized based on predetermined information and said indication of priority represents said prioritization;
    transferring immediately, by said management object computer, event information having high priority to said manager computer to store said event information having high priority in a master database in said management computer,
    wherein event information having a high priority that are transferred immediately, by said management object computer, represents abnormal operation requiring immediate attention by said management computer;
    adding ID information for discriminating said work to event information having low priority to store said event information having low priority in a local database in said management object computer,
    wherein said ID information uniquely identifies said single work, relative to other single works, from which said divided work is obtained and uniquely identifies said divided work, relative to other divided works, forming a part of said single work;
    retrieving event information corresponding to ID information included in a request received from said manager computer from said local database in accordance with a reception of said request from said manager computer; and
    transferring said retrieved event information to said manager computer to store said retrieved event information in a master database of said manager computer.

4. A computer system in a network system which includes a manager computer and a plurality of management object computers each of which executes divided work divided from a single work, said management object computer comprising:
    means for detecting an event generated by execution of each divided work divided from said work in said management object computers to produce event information including priority corresponding to urgency of said event detected,
    wherein event information corresponding to events which occur during execution of said divided work are prioritized based on predetermined information and said indication of priority represents said prioritization;

means for transferring immediately, by said management object computer, event information having high priority to said manager computer to store said event information having high priority in a master database in said manager computer;

wherein event information having a high priority that are transferred immediately, by said management object computer, represents abnormal operation requiring immediate attention by said manager computer;

means for adding ID information for discriminating said divided work to event information having low priority to store said event information having low priority in a local database in said management object computer, wherein said ID information uniquely identifies said single work, relative to other single works, from which said divided work is obtained and uniquely identifies said divided work, relative to other divided works, forming a part of said single work;

means for retrieving event information corresponding to ID information included in a request received from said manager computer from said local database in accordance with a reception of said request from said manager computer; and means for transferring said retrieved event information to said manager computer to store said retrieved event information in a master database of said manager computer.

* * * * *